US008566557B2

(12) United States Patent
Olsson et al.

(10) Patent No.: US 8,566,557 B2
(45) Date of Patent: Oct. 22, 2013

(54) METHOD AND SYSTEM FOR STORAGE OF DATA

(75) Inventors: Göran Olsson, Stockholm (SE); Leif Byström, Älvsjö (SE); Mats Mårdberg, Sundbyberg (SE)

(73) Assignee: Ikonoskop AB, Stockholm (SE)

( * ) Notice: Subject to any disclaimer, the term of this patent is extended or adjusted under 35 U.S.C. 154(b) by 117 days.

(21) Appl. No.: 13/377,837

(22) PCT Filed: Jun. 16, 2010

(86) PCT No.: PCT/SE2010/050675
§ 371 (c)(1),
(2), (4) Date: Dec. 13, 2011

(87) PCT Pub. No.: WO2010/147546
PCT Pub. Date: Dec. 23, 2010

(65) Prior Publication Data
US 2012/0102266 A1    Apr. 26, 2012

(30) Foreign Application Priority Data

Jun. 16, 2009 (SE) ........................................ 0950463

(51) Int. Cl.
*G06F 12/00* (2006.01)
(52) U.S. Cl.
USPC ........... 711/170; 711/103; 711/104; 711/156; 711/203

(58) Field of Classification Search
None
See application file for complete search history.

(56) References Cited

U.S. PATENT DOCUMENTS

| 5,301,288 A | 4/1994 | Newman et al. |
|---|---|---|
| 6,195,734 B1 | 2/2001 | Porterfield |
| 6,266,753 B1 | 7/2001 | Hicok et al. |
| 2004/0068522 A1 | 4/2004 | Daniels et al. |
| 2006/0253484 A1* | 11/2006 | Bangalore et al. ............ 707/102 |

FOREIGN PATENT DOCUMENTS

| WO | WO-9114986 A1 | 10/1991 |
|---|---|---|
| WO | WO-9903040 A1 | 1/1999 |

* cited by examiner

*Primary Examiner* — Shawn X Gu
(74) *Attorney, Agent, or Firm* — Harness, Dickey & Pierce, P.L.C.

(57) ABSTRACT

A method and a system are disclosed for storing initial data from an image detecting device in a camera system initial storage medium and making the data accessible. The initial data is stored consecutively in blocks, where file specific pointers representing the starting address for each stored file and file sequence, and dynamic memory pointers that points out the next writable address, are managed and stored during real time writing of the data. The data is made accessible through a virtual representation of the data in a virtual file system with a format known by an external storage medium controller, the virtual representation being related to the file specific pointers.

31 Claims, 2 Drawing Sheets

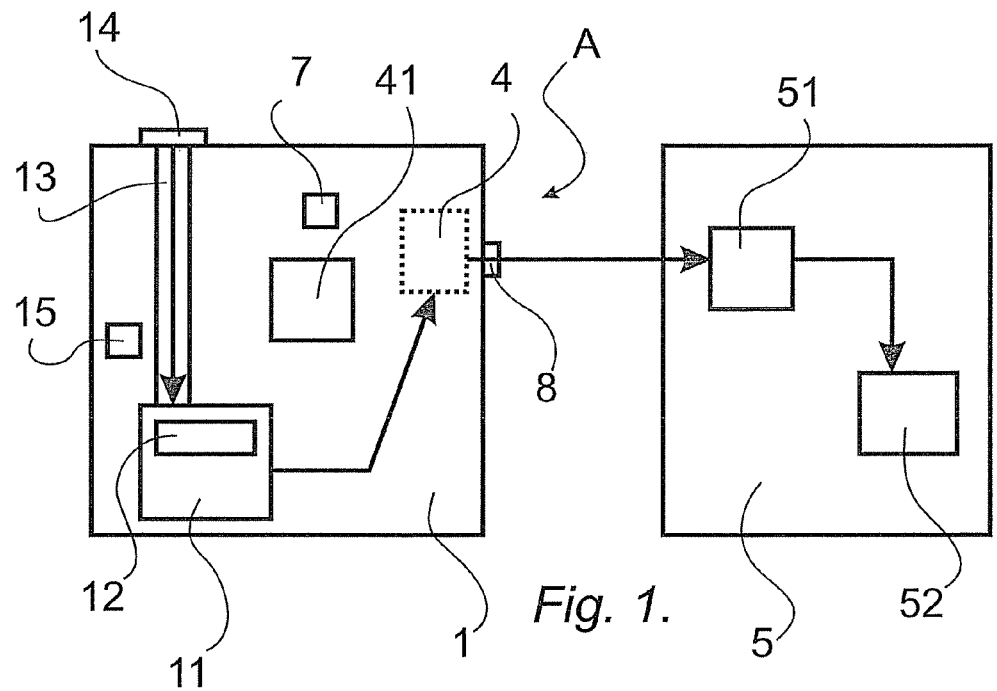
Fig. 1.
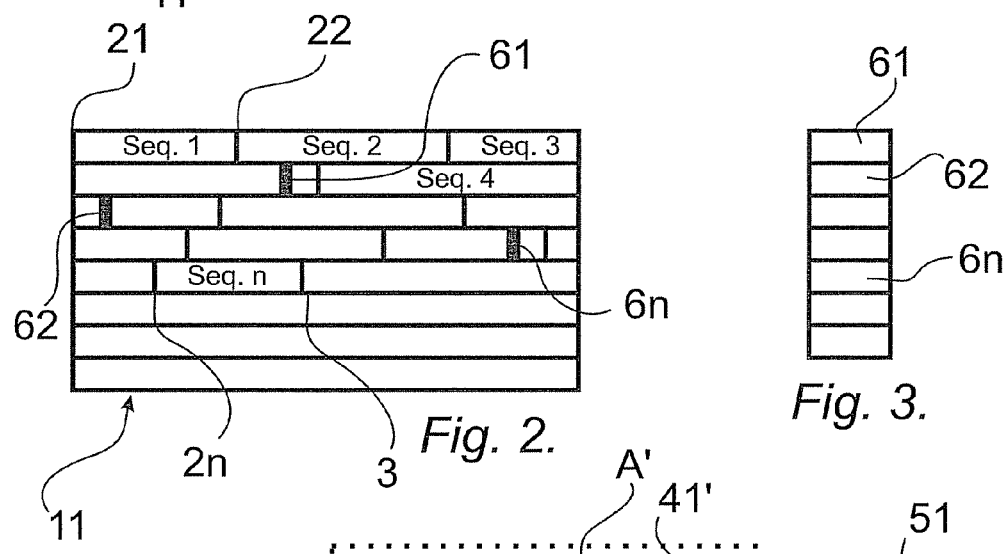
Fig. 2.
Fig. 3.
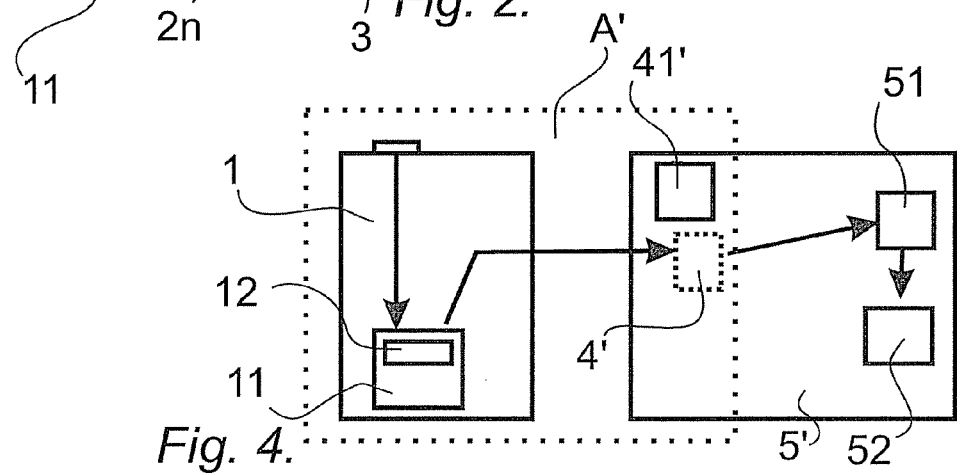
Fig. 4.

METHOD AND SYSTEM FOR STORAGE OF DATA

FIELD OF INVENTION

The present invention relates to a method and a system for storing initial data from an image detecting device in a camera system initial storage medium and later accessing the data. The initial data is stored consecutively in blocks, where file specific pointers representing the starting address for each stored file and file sequence, and dynamic memory pointers that points out the next writable address, are managed and stored during real time writing of the data.

DESCRIPTION OF BACKGROUND ART

It is previously known to use an initial storage medium controller (ISM Ctrl) that runs in an initial computing system, such as a camera system, to download initial data from a data input interface and store it on an initial storage medium (ISM) in an initial format that is non-standardized or "de facto" known. A storage medium is a medium/device for storing/recording information data.

When the initial data shall be transferred to an external storage medium (ESM), which is controlled by an external storage media controller (ESM Ctrl) that runs in an external computing system, i.e. a computer, control processor unit system etc., the ESM Ctrl is not familiar with the unknown proprietary format.

It is then known to implement a software driver for the external storage media controller that is able to interpret the data and, via the external storage media controller's own operating system and runtime environment, stores the data on the other storage medium, that is controlled by the external storage media controller, in a file system format that the operating system can control and manage.

File system types can be classified into several categories such as disk file systems, flash file systems, network file systems and other special purpose file systems.

SUMMARY OF THE PRESENT INVENTION

Problems

It is a problem for a data processing computing system with high band-width requirements and real time constraints on the acquisition side and more relaxed bandwidth requirements and real time constraints but much stricter constraints regarding standardized communication interfaces, standardized data format and standardized data file system representation on the transmitting or forwarding side, such as a camera system, to acquire and process data and then forward the processed data to a receiving computing system in a smooth and plug-and-playable manner.

It is an even harder problem for said computing system to acquire and process data and then forward the processed data to a receiving computing system in a smooth and plug-and-playable manner, when absolute maximum burst writing performance of the system initial storage medium is required.

It is a problem to implement new format converting software for every unknown and non-standardized format that the external storage media controller has to support.

It is a problem to implement a new version of the format converting software for each unique combination of external storage medium controller and operating system.

It is also a problem that all versions of the format converting software have to be modified if the initial storage medium controller somehow changes the initial format for the data that is stored on the initial medium.

Solution

With the purpose of solving one or more of the above indicated problems from the standpoint of the above indicated field of invention, and with the purpose of achieving the maximum burst writing performance to an initial storage medium (ISM), the present invention teaches that an initial storage medium controller (ISM Ctrl) is optimized for as fast writing as possible, i.e. with minimized traditional file system maintenance processes such as sector and block cleanup/defragmentation, advanced wear levelling etc. that may stall the highly prioritized writing process and thereby reduce the burst writing performance.

The inventive method and system avoids the described problems by letting a virtual file system controller (VFS Ctrl) dynamically buffer a virtual representation of the data in a virtual file system (VFS) where the VFS format is commonly known by other kinds of storage medium controllers.

The meaning of a VFS is that such a file system is not traditionally implemented in any physical storage medium such as the initial storage medium, the file system is implemented internally within the VFS controllers own processing environment and is only momentarily instantiated on-demand in the VFS controllers own RAM-like memory when a request to access the data is received.

The VFS Ctrl presents the data towards the external storage medium controller in such manner that it is recognised as if the data is stored in files on a file system commonly known by the external storage medium controller.

Because of the extremely high data rate from the image sensor, the initial data must be stored as fast as possible into used storage medium. According to one proposed embodiment of the present invention a data pipeline is implemented from the image detecting device to the initial storage medium, and due to the high data rate requirements the implementation is not done by using traditional CPU software but is instead implemented in an FPGA by using source code in a hardware description language (HDL). To handle, at the same time, the complexity of a file system and image files in this fashion is almost impossible, especially when the performance is considered. So basically the data has to be stored sequentially as it comes. This is not readable by an ordinary computer but can be made available through the VFS.

If a flash memory device is used as ISM it is proposed that the virtual file system origins from the flash file system of the flash memory device.

In order to avoid that a single memory block is repeatedly overwritten and thus wear out when using a flash memory device, it is proposed that the system makes use of a simplified wear leveling technique; Every time when the flash memory is completely erased, the ISM Ctrl randomly calculates an initial memory pointer, pointing out the initial memory block address where ISM Ctrl will start to write data. When the dynamic memory pointer exceeds the last physical memory block address by one memory block address unit, the ISM Ctrl will reset the dynamic memory pointer to the first writable physical memory block address and from there continue to increment the dynamic memory pointer. The last writable memory block will then be the initial memory block address decremented by one memory block address unit.

With the purpose to manage bad memory blocks it is proposed that an algorithm to detect bad memory blocks is used, that the positions of identifies bad memory blocks are stored, for example in a list, and that when the dynamic memory pointer enters an address of a bad memory block, the dynamic memory pointer is increment the by one memory block address unit without writing any data into the identified bad memory block.

The present invention teaches that complex implementations of the file system architecture itself is created once for every new connection to an external computing system and stored in an internal RAM memory, that more voluminous and repetitive parts of the file system, such as file/image data, are created on the fly, and that the actual image data is retrieved on demand from the initial storage medium.

It is also proposed that the number of takes stored and the number of frames for each take is used as input to create the virtual file system in the format of a FAT32 file system or file system skeleton.

The virtual representation of the initial data presents the data in a standardised format for digital photography. One such standardised format is the Digital Negative format (DNG). This particular format can be easily implemented since it does not require any further conversion or compression of the data. There are many other standardised image file formats such as Joint Photographic Experts Group (JPEG) and Tagged Image File Format (TIFF) and these formats can also be used, however, these formats would also require that the VFS Ctrl performs a conversion of the initial data into the image file format as the initial data is to be presented to the external storage medium controller.

The inventive virtual file system controller can be implemented in different ways. One proposed implementation is that the initial computing system comprises the virtual file system controller, thus making the initial computing system compatible with any external computing system that can access the file format presented by the virtual file system controller.

Another possible implementation is that the external computing system comprises the virtual file system controller. This would provide a simple and less expensive camera system but on the other hand it would require an extra computer program component in the external computing system in order to realize the virtual file system controller and access the initial data in the camera system.

Advantages

The advantages of a method and a system according to the present invention are that invention is applicable to all forms of data acquisition devices that have real time constraints on the acquisition side and more relaxed real time constraints during "offloading". Another advantage is that the invention is applicable to all forms of data acquisition devices that have real time constraints on the acquisition side and stricter constraints regarding standardized communication interfaces, standardized data format and standardized data file system representation during "offloading". Another advantage is that the creator of data acquisition devices according to the invention doesn't have to bother with the ECS side software, especially on driver level.

BRIEF DESCRIPTION OF THE DRAWINGS

A method and a system according to the present invention will now be described in detail with reference to the accompanying drawings, in which:

FIG. 1 is a schematic and simplified illustration of an inventive method and system, FIG. 2 is a schematic and highly simplified illustration of a initial storage medium, FIG. 3 is a schematic illustration of a list with bad memory blocks, FIG. 4 is a schematic and simplified illustration of an alternative embodiment of an inventive system.

DESCRIPTION OF EMBODIMENTS AS PRESENTLY PREFERRED

Figure 5:
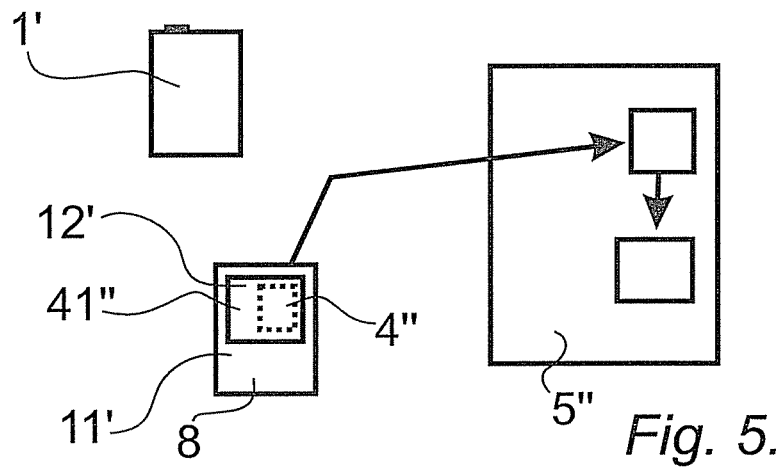
FIG. 5 is a schematic and simplified illustration of a first embodiment with an initial storage medium as a standalone unit.

The present invention will now be described with reference to FIG. 1 showing a method where traditional file system maintenance processes are eliminated in order to achieve the maximum burst writing performance to an initial storage medium (ISM) 11 by an initial storage medium controller (ISM Ctrl) 12.

Data is consecutively stored in blocks, i.e. consecutive data is always physically stored in consecutive blocks or sectors. It is not accepted to divide consecutive data in non-consecutive blocks or sectors. One direct implication is a limited data delete function, where deletion of data must follow a "last-in-first-out" rule, i.e. all data stored after a specific data block or sector must be deleted before this specific data block can be deleted.

FIG. 2 show schematically an initial storage medium 11 where it is illustrated that the data must be stored in files and sequences of files, and that the ISM Ctrl 12 must, momentarily during real-time writing, be able to store a file specific memory pointer 21, 22, . . . , 2n, representing the starting address for each stored file and file sequence Seq. 1, Seq. 2, . . . , Seq. n. The ISM Ctrl 12 will also store and manage a dynamic memory pointer 3 that points out the next writable address in the ISM 11. The ISM Ctrl 12 must also be able to administrate all the memory pointers 21, 22, . . . , 2n, in such a manner that later on, in a situation with no real-time restrictions, when access is required to data belonging to a specific file and file sequence, the ISM Ctrl 12 could find and read this specific file and file sequence data.

The present invention teaches that thus stored data is made accessible through a virtual representation of the data in a virtual file system 4 with a format that is known by an external storage medium controller 51 so that the data can be transferred to an external medium 52, and that the virtual representation is related to the file specific pointers 21, 22, . . . , 2n.

The virtual file system 4 is momentarily instantiated on-demand when a request to access the data is received and the virtual file system 4 is implemented internally within the processing environment of a virtual file system controller 41.

The present invention teaches that the virtual file system controller 41 presents the data towards the external storage medium controller 51 in such manner that it is recognised as if the data is stored in files on a file system commonly known by the external storage medium controller 51.

One possible embodiment shows that a data pipeline 13 is used from the image detecting device 14 of the system 1 to the initial storage medium 11, and that a Field-Programmable Gate Array (FPGA) 15 is used to control the storing of the initial data.

Different memory devices can be used as an initial storage medium 11 and one possible memory device is a flash memory device, in which case the virtual file system 4 origins from the flash file system of the flash memory device.

If using a flash memory device it is proposed that each time the flash memory device is completely erased, an initial memory pointer, pointing out the initial memory block address where new data will start to be written, is randomly calculated. It is then proposed that when the dynamic memory pointer 3 exceeds the last physical memory block address in the storage medium 11 by one memory block address unit, the dynamic memory pointer 3 is reset to the first writable physical memory block address and that the dynamic memory pointer 3 is continued to be incremented from there.

It is also proposed that an algorithm to detect bad memory blocks is used, that the positions 61, 62, . . . , 6n, of identified bad memory blocks are stored, for example in a list 6, schematically shown in FIG. 3, and that when the dynamic memory pointer 3 enters an address 61, 62, . . . , 6n of a bad memory block, the dynamic memory pointer 3 is increment the by one memory block address unit without writing any data into the identified bad memory block.

Complex implementations of the file system architecture itself is created once for every new connection to an external computing system and stored in an internal RAM memory 7, while more voluminous and repetitive parts of the file system, such as file/image data, are created on the fly, and the actual image data is retrieved on demand from the initial storage medium 11.

The number of takes stored and the number of frames for each take is used as input to create the virtual file system 4 and it is proposed that the virtual file system 4 is created in the format of a FAT32 file system or file system skeleton.

One possible way of implementing the present invention is that a virtual representation of the initial data presents the data in a standardised format for digital photography, such as Digital Negative format (DNG).

With renewed reference to FIG. 1 an inventive system A will now be described, a system A for storing initial data by means of an initial computing system 1 belonging to a camera system and later accessing the initial data. The initial computing system 1 comprises an initial storage medium (ISM) 11 and an initial storage medium controller (ISM Ctrl) 12, which is adapted to store the initial data in the ISM 11 consecutively in blocks.

As shown in FIG. 2 the ISM Ctrl 12 momentarily stores file specific pointers 21, 22, . . . , 2n representing the starting address for each stored file sequence Seq. 1, Seq. 2, . . . , Seq. n, during real time writing of the data into the ISM 11. The ISM Ctrl 12 is also adapted to store and manage a dynamic memory pointer 3 that points out the next writable address in the ISM 11, and the ISM Ctrl 12 is adapted to administrate all the memory pointers 21, 22, . . . , 2n in such a manner that when access is required to data belonging to a specific file sequence Seq. 1, Seq. 2, . . . , Seq. n, the ISM Ctrl 12 can find and read the specific file sequence data.

A virtual file system controller (VFS Ctrl) 41 is adapted to dynamically buffer a virtual representation of the data in a virtual file system (VFS) 4 by means w of the file specific pointers 21, 22, . . . , 2n, where the VFS format is commonly known by an external storage medium controller (ESM Ctrl) 51 belonging to an external computing system (ECS) 5.

The VFS Ctrl 41 is adapted to instantiate the VFS 4 momentarily on-demand when a request to access the data is received from the ESM Ctrl 51, in which case the VFS Ctrl 41 is adapted to implement the VFS 4 internally within the its own processing environment.

The VFS Ctrl 41 is adapted to present the data towards the ESM Ctrl 51 in such manner that it is recognised as if the data is stored in files on a file system commonly known by the ESM Ctrl 51.

It is also proposed that the inventive system A comprises a data pipeline 13 from the image detecting device 14 of the system to the ISM 11, and that a Field-Programmable Gate Array (FPGA) 15 is adapted to control the storing of the initial data.

The ISM 11 can be a flash memory device, in which case the VFS 4 origins from the flash file system of the flash memory device. It is proposed that the ISM Ctrl 12 is adapted to randomly calculate an initial memory pointer, pointing out the initial memory block address where new data will start to be written each time the flash memory device is completely erased.

It is also proposed that the ISM Ctrl 12 is adapted to reset the dynamic memory pointer 3 to the first writable physical memory block address when the dynamic memory pointer 3 exceeds the last physical memory block address in the ISM 11 by one memory block address unit, and that the ISM Ctrl 12 is adapted to continue to be increment the dynamic memory pointer 3 from there.

With the purpose of managing bad memory blocks in the ISM 11 it is proposed that the ISM Ctrl 12 is adapted to use an algorithm to detect bad memory blocks, that the ISM Ctrl 12 is adapted to store the positions 61, 62, . . . , 6n, of identified bad memory blocks, for example in a list 6, schematically shown in FIG. 3, and that the ISM Ctrl 12 is adapted to increment the dynamic memory pointer 3 by one memory block address unit without writing any data into an identified bad memory block when said dynamic memory pointer enters an address of a bad memory block.

The VFS Ctrl 41 is adapted to create complex implementations of the file system architecture itself once for every new connection to an external computing system (ECS) 5 and to store it in an internal RAM memory 7. The VFS Ctrl 41 is also adapted to create more voluminous and repetitive parts of the file system, such as file/image data, on the fly, and to retrieve the actual image data from the ISM 11 on demand.

The VFS Ctrl can be adapted to use the number of takes stored and the number of frames for each take as input to create the VFS in the format of a FAT32 file system or file system skeleton.

In order to provide a well known format that can be managed by different kinds of external computing systems 5 it is proposed that the VFS Ctrl 41 is adapted to create the virtual representation of the initial data so that it presents the data in a standardised format for digital photography, such as Digital Negative format (DNG).

In this description it is shown that the initial computing system 1 comprises the VFS Ctrl 41. However, as shown in FIG. 4, it should be understood that in an inventive system A' it is also possible that the external computing system 5 comprises the VFS Ctrl 41', where the VFS 4' is created in the external computing system 5'.

Another possible implementation of the present invention is illustrated in FIG. 5, showing that the ISM 11' with its ISM Ctrl 12'. when removed from the initial computing system 1', can be adapted to act as a standalone unit 8, and as such be connected to the external computing system 5". According to one embodiment, the ISM Ctrl 12' is also acting as a VFS Ctrl 41" and the VFS 4" realised on the ISM 11'.

Figure 6:
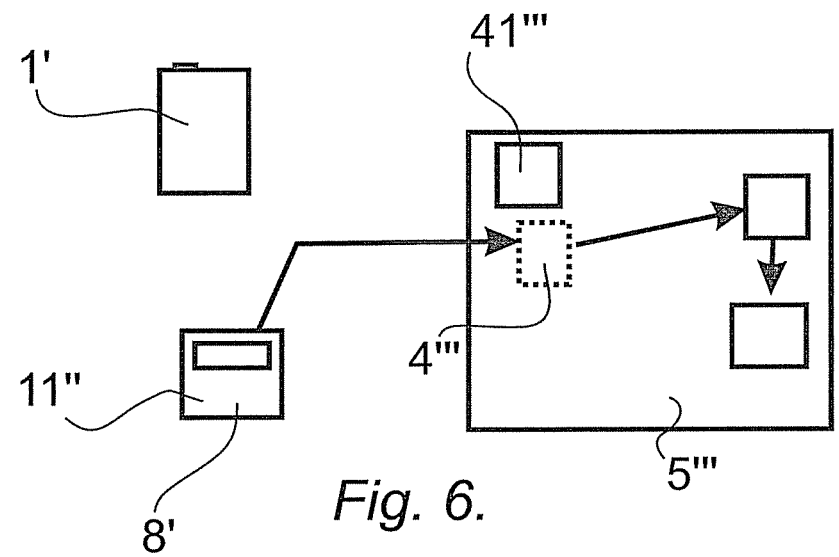
FIG. 6 is a schematic and simplified illustration of a second embodiment with an initial storage medium as a standalone unit.

According to another embodiment illustrated in FIG. 6 the external computing system 5''' comprises the VFS Ctrl 41''' and the VFS 4''' is created in the external computing system 5''', in which case it is possible to access the standalone unit 8' and the data in the ISM 11" without having to realise the VFS and the VFS Ctrl in the standalone unit 8'.

The standalone unit 8, 8' will allow the external computing system 5", 5''' to access the information in the ISM 11', 11" without having to use the initial computing system 1' to access the information.

FIG. 1 shows the present invention in a very simplified way where the Initial Computing System (ICS) 1 is represented by a camera system and the External Computer System (ECS) 5 is represented as a hosting computer. The camera system detects that a hosting computer is connected to the USB 8 connector.

The camera system presents itself as a USB mass storage device, The hosting computer then starts to read basic information about the newfound storage device by reading sectors from the storage device.

The camera system responds with sectors that correspond with sectors usually found in mass storage devices like partition tables, boot-sectors and so on.

When the hosting computer asks for sectors that is a part of the file system or file headers, the camera system responds with the pre-computed sectors or sectors created on the fly. In this embodiment, the hosting computer reads the file system format as FAT32 and the file format as DNG. The hosting computer will then be able to build up and represent the stored image sequences in a file system format (i.e. FAT32) and file format (i.e. DNG, CinemaDNG) that the hosting computer fully understands.

When the hosting computer asks for sectors containing actual image data, the camera system retrieves the data from the ISM.

It will be understood that the invention is not restricted to the aforedescribed and illustrated exemplifying embodiments thereof and that modifications can be made within the scope of the inventive concept as defined by the accompanying Claims.

The invention claimed is:

1. Method for storing initial data from an image detecting device in a camera system initial storage medium and making said data accessible, comprising:
storing said initial data consecutively in blocks;
storing file specific pointers, each respectively representing a starting address for each respective stored file and file sequence, and storing dynamic memory pointers to point out a next writable address, the file specific and dynamic memory pointers being managed and stored during real time writing of said data; and
making said data accessible through a virtual representation of said data in a virtual file system with a format that is known by an external storage medium controller, said virtual representation being related to said file specific pointers.

2. Method according to claim 1, wherein said virtual file system is momentarily instantiated on-demand when a request to access said data is received.

3. Method according to claim 2, wherein said virtual file system is implemented internally within a processing environment of a virtual file system controller.

4. Method according to claim 3, wherein said virtual file system controller presents the data towards the external storage medium controller in such manner that it is recognized as if the data is stored in files on a file system commonly known by the external storage medium controller.

5. Method according to claim 2, wherein complex implementations of a file system architecture are created once for every new connection to an external computing system and stored in an internal random access memory (RAM) memory, wherein more voluminous and repetitive parts of a file system are created on the fly, and wherein an actual image data is retrieved on demand from the storage medium.

6. Method according to claim 1, wherein said initial storage medium is a flash memory device, and wherein said virtual file system origins from a flash file system of said flash memory device.

7. Method according to claim 6, wherein each time said flash memory device is completely erased, an initial memory pointer, pointing out an initial memory block address where new data will start to be written, is randomly calculated.

8. Method according to claim 7, wherein when a particular dynamic memory pointer exceeds the last physical memory block address in said storage medium by one memory block address unit, the particular dynamic memory pointer is reset to a first writable physical memory block address and that said particular dynamic memory pointer is continued to be incremented from there.

9. Method according to claim 1, wherein an algorithm to detect bad memory blocks is used, wherein positions of detected bad memory blocks are stored, and wherein, when a particular dynamic memory pointer enters an address of a particular bad memory block, said particular dynamic memory pointer is incremented by one memory block address unit without writing any data into said particular bad memory block.

10. Method according to claim 9, wherein an algorithm to detect bad memory blocks is used, wherein positions of detected bad memory blocks are stored in a list.

11. Method according to claim 1, wherein a number of takes stored and a number of frames for each take is used as input to create said virtual file system in a format of a FAT32 file system or file system skeleton.

12. Method according to claim 1, wherein said virtual representation of said initial data presents said data in a standardized format for digital photography.

13. Method according to claim 12, wherein said standardized format for digital photography is a Digital Negative format (DNG).

14. System for storing initial data by way of an initial computing system belonging to a camera system and making said initial data accessible, said initial computing system comprising:
an initial storage medium (ISM); and
an initial storage medium controller (ISM Ctrl), adapted to store said initial data in said ISM consecutively in blocks, said ISM Ctrl being adapted to store file specific pointers, each representing a respective starting address for each respective stored file sequence during real time writing of said data into said ISM, said ISM Ctrl being adapted to store and manage a dynamic memory pointer to point out a next writable address in said ISM, and said ISM Ctrl being adapted to administrate all the file specific and dynamic memory pointers in such a manner that when access is required to store data belonging to a specific file sequence, said ISM Ctrl is adapted to find and read said specific file sequence data; and
a virtual file system controller (VFS Ctrl), adapted to make the initial data accessible by dynamically buffering a virtual representation of the initial data in a virtual file system (VFS) with a VFS format known by an external storage medium controller (ESM Ctrl) belonging to an external computing system (ECS), said virtual representation being related to said file specific pointers.

15. System according to claim 14, wherein said VFS Ctrl is adapted to instantiate said virtual file system momentarily on-demand when a request to access said initial data is received from said ESM Ctrl.

16. System according to claim 15, wherein said VFS Ctrl is adapted to implement said virtual file system internally within the its own processing environment.

17. System according to claim 16, wherein said VFS Ctrl is adapted to present the initial data towards said ESM Ctrl in such manner that it is recognized as if the initial data is stored in files on a file system commonly known by said ESM Ctrl.

18. System according to claim 15, wherein said VFS Ctrl is adapted to create complex implementations of a file system architecture itself once for every new connection to an external computing system (ECS) and store it in an internal RAM memory, wherein said VFS Ctrl is adapted to create more voluminous and repetitive parts of a file system on the fly, and wherein said VFS Ctrl is adapted to retrieve actual image data from the ISM on demand.

19. System according to claim 14, further comprising:
 a data pipeline from an image detecting device to said ISM; and
 a Field-Programmable Gate Array (FPGA) adapted to control the storing of said initial data.

20. System according to claim 14, wherein said ISM is a flash memory device, and wherein said virtual file system origins from a flash file system of said flash memory device.

21. System according to claim 20, wherein said ISM Ctrl is adapted to randomly calculate an initial memory pointer, pointing out an initial memory block address where new data will start to be written each time said flash memory device is completely erased.

22. System according to claim 21, wherein said ISM Ctrl is adapted to reset said dynamic memory pointer to a first writable physical memory block address when said dynamic memory pointer exceeds the last physical memory block address in said ISM by one memory block address unit, and wherein said ISM Ctrl is adapted to continue to be increment said dynamic memory pointer from there.

23. System according to claim 14, wherein said ISM Ctrl is adapted to use an algorithm to detect bad memory blocks, wherein said ISM Ctrl is adapted to store a positions of identified bad memory blocks, and wherein said ISM Ctrl is adapted to increment said dynamic memory pointer by one memory block address unit without writing any data into an identified bad memory block when said dynamic memory pointer enters an address of a bad memory block.

24. System according to claim 23, wherein ISM Ctrl is adapted to store the positions of identified bad memory blocks in a list.

25. System according to claim 14, wherein said VFS Ctrl is adapted to use a number of takes stored and a number of frames for each take as input to create said VFS in a format of a FAT32 file system or file system skeleton.

26. System according to claim 14, wherein said VFS Ctrl is adapted to create said virtual representation of said initial data so that it presents said initial data in a standardized format for digital photography.

27. System according to claim 26, wherein said standardized format for digital photography is a Digital Negative format (DNG).

28. System according to claim 14, wherein said initial computing system comprises said virtual file system controller (VFS Ctrl).

29. System according to claim 14, wherein said external computing system comprises said virtual file system controller (VFS Ctrl).

30. System according to claim 29, wherein said ISM is adapted to act as a standalone unit, and wherein said standalone unit is adapted to communicate with said external computing system.

31. System according to claim 14, wherein said ISM is adapted to act as a standalone unit, wherein said standalone unit comprises said virtual file system controller (VFS Ctrl), and wherein said standalone unit is adapted to communicate with said external computing system.

* * * * *